United States Patent
Wu et al.

(10) Patent No.: US 9,491,757 B2
(45) Date of Patent: Nov. 8, 2016

(54) METHOD AND APPARATUS FOR DETERMINING RELAY LINK RESOURCE ELEMENT GROUP

(75) Inventors: Shuanshuan Wu, Shenzhen (CN); Feng Bi, Shenzhen (CN); Yifei Yuan, Shenzhen (CN); Ming Yuan, Shenzhen (CN); Feng Liang, Shenzhen (CN); Jin Yang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 329 days.

(21) Appl. No.: 13/884,070
(22) PCT Filed: Nov. 3, 2011
(86) PCT No.: PCT/CN2011/081763
§ 371 (c)(1),
(2), (4) Date: May 8, 2013
(87) PCT Pub. No.: WO2012/062178
PCT Pub. Date: May 18, 2012

(65) Prior Publication Data
US 2013/0223332 A1 Aug. 29, 2013

(30) Foreign Application Priority Data
Nov. 8, 2010 (CN) .......................... 2010 1 0536152

(51) Int. Cl.
*H04W 72/04* (2009.01)
*H04L 5/00* (2006.01)
(Continued)

(52) U.S. Cl.
CPC ........ *H04W 72/0446* (2013.01); *H04L 5/0048* (2013.01); *H04L 27/2647* (2013.01); *H04W 84/047* (2013.01)

(58) Field of Classification Search
CPC ......................... H04W 72/0446; H04W 72/04
See application file for complete search history.

(56) References Cited

U.S. PATENT DOCUMENTS

2011/0007695 A1* 1/2011 Choi et al. ..................... 370/329
2011/0194551 A1* 8/2011 Lee ........................ H04B 7/0626
370/342
(Continued)

FOREIGN PATENT DOCUMENTS

CN 101527916 9/2009
CN 101605023 12/2009
(Continued)

OTHER PUBLICATIONS

Panasonic., 3GPP TSG RAN WG1 Meeting #62, R1-105052, Aug. 23-27, 2010, 6 Pages, "R-PDCCH interleaving details."
(Continued)

*Primary Examiner* — Jenee Williams
(74) *Attorney, Agent, or Firm* — Brooks Kushman P.C.

(57) ABSTRACT

A method and an apparatus for determining a relay link resource element group are disclosed. The method includes: determining a size of a relay link resource element group according to a pattern of a non-zero-power Channel State Information Reference Signal (CSI-RS), and/or a pattern of a zero-power CSI-RS and/or a pattern of a Common Reference Signal (CRS), and/or a pattern of a Demodulation Reference Signal (DMRS) transmitted in a resource block in which the resource element group locates in allocated resources. The allocated resources are used for a transmission over a relay link physical downlink control channel, including one or more continuously or discretely distributed resource blocks in the frequency domain, while including one or more Orthogonal Frequency Division Multiplexing (OFDM) symbols in the time domain.

10 Claims, 8 Drawing Sheets

(51) Int. Cl.
*H04L 27/26* (2006.01)
*H04W 84/04* (2009.01)

(56) References Cited

U.S. PATENT DOCUMENTS

| | | | |
|---|---|---|---|
| 2011/0237283 A1* | 9/2011 | Shan et al. | 455/509 |
| 2011/0310817 A1 | 12/2011 | Okubo et al. | |
| 2012/0014330 A1* | 1/2012 | Damnjanovic | H04L 5/001 370/329 |
| 2012/0039220 A1* | 2/2012 | Chen et al. | 370/279 |
| 2012/0063384 A1 | 3/2012 | Bi et al. | |

FOREIGN PATENT DOCUMENTS

| | | |
|---|---|---|
| CN | 101841363 | 9/2010 |
| WO | 2010053145 | 5/2010 |

OTHER PUBLICATIONS

TSG-RAN WG1 Meeting #62b R1-105447, Oct. 11-15, 2010, 5 Pages, "Details of REG-level Interleaving and REG Size for R-PDCCH."

Qualcomm Incorporated., 3GPP TSG RAN WG1 #62bis, R1-105586, Oct. 11-15, 2010, 4 Pages, "Details of R-PDCCH interleaver."

TSG-RAN WG1 Meeting #62b, R1-105809, Oct. 11-15, 2010, 5 Pages, "Way Forward on REG Definition for Interleaved R-PDCCH."

Japanese Office Action for JP2013-536995, Completed by the Japanese Patent Office on May 15, 2014, 4 Pages.

International Search Report for PCT/CN2011/081763, English Translation attached to original, Both completed by the Chinese Patent Office on Jan. 16, 2012, All together 9 Pages.

* cited by examiner

METHOD AND APPARATUS FOR DETERMINING RELAY LINK RESOURCE ELEMENT GROUP

CROSS-REFERENCE TO RELATED APPLICATIONS

This application is a U.S. national phase of PCT Application No. PCT/CN2011/081763 filed Nov. 3, 2011 which claims priority to Chinese Application No. 201010536152.5 filed Nov. 8, 2010, the disclosures of which are incorporated in their entirety by reference herein.

TECHNICAL FIELD

The present document relates to the mobile communication technology field, and in particular, relates to a method and an apparatus for determining a relay link resource element group.

BACKGROUND OF THE RELATED ART

At present, the requirement of the development of the mobile communication is to be able to support a higher transmission rate, a better signal coverage and a higher resource utilization rate. The Relay technology can increase the coverage, and balance and increase the throughput of the cell, and the Relay Node (abbreviated as RN), compared with the base station, has a relatively smaller allocation cost, so the relay is considered as a critical technology in an evolution system of the 3rd Generation Partnership Project (abbreviated as 3GPP) Long Term Evolution (abbreviated as LTE, usually referring to Release 8 or Release 9 protocol edition, abbreviated as Rel-8 or Rel-9)—LTE-Advanced (abbreviated as LTE-A, usually referring to Release 10 protocol edition, abbreviated as Rel-10).

The LTE/LTE-A system downlink is based on the Orthogonal Frequency Division Multiplexing (OFDM) technology. In the OFDM system, the communication resources are in the time-frequency two-dimension form.

In the LTE/LTE-A system, the communication resources in the downlink are divided using the frame as a unit in the time direction. As shown in FIG. 1, a length of every radio frame is of 10 ms, including 10 sub-frames with the length of 1 ms. As shown in FIG. 2, every sub-frame is divided into two slots in the time direction as well. According to the difference of the lengths of the Cyclic Prefix (abbreviated as CP), every sub-frame can include 14 or 12 OFDM symbols. When the sub-frame adopts a Normal CP length, the sub-frame includes 14 OFDM symbols, and every slot contains 7 symbols; when the sub-frame adopts an Extended CP length, the sub-frame includes 12 OFDM symbols, and every slot contains 6 symbols.

In the LTE/LTE-A system, the communication resources in the downlink are in the frequency direction, and the resources are divided using the sub-carrier as a unit. Specifically, in the communication, the minimum unit of the allocated resources is Resource Block (RB), which corresponds to a physical resource block (PRB) of the physical resource. As shown in FIG. 2, one PRB includes 12 sub-carriers in the frequency domain, corresponding to a slot in the time domain. The two RBs in the sub-frame which are adjacent in the time domains are called a RB pair. The resource corresponding to one sub-carrier on every OFDM symbol is called the Resource Element (abbreviated as RE).

As shown in FIG. 2, a physical resource structure is provided with the normal CP length. If it is not especially illustrated hereinafter, the serial number of the OFDM symbol in the sub-frame is 0-13 when the normal CP length is adopted, and the OFDM symbol in the slot is numbered as 0-6; the serial number of the OFDM symbol in the sub-frame is 0-11 when the extended CP length is adopted, and the OFDM symbol in the slot is numbered as 0-5.

After introducing the relay station, it is equivalent to add one hop for the data transmission. Taking a two-hop system as an example, a communication mode of an original base station—a UE has been turned into a communication mode of a base station—a relay station—a UE, wherein, a base station—relay station link is called a relay link (a backhaul link or called a Un interface), a relay station—UE link is called an access link (or called a Uu interface), and a base station—UE link is called a direct link. In a multi-hop system, some UEs access the relay station, and finish the communication service through the relay station.

After introducing the relay station, the backward compatibility with the UE needs to be guaranteed, that is, it is guaranteed that the UE of the previous edition (such as LTE Release-8, abbreviated as Rel-8) also can access the relay station of the LTE-A system. At this time, it needs to, on condition of not influencing the communication of the subordinate UE of the relay station, set apart some resources to ensure the communication between the base station and the relay station. Now in the LTE-A system, it is determined that the base station—relay station communication and the relay station—UE communication are performed in the time division mode. Specifically, a part of the downlink sub-frames are set apart used for the base station—relay station communication, and these sub-frames are called Relay sub-frame (or called Un sub-frame). For the Rel-8 UE which is subordinate to the relay station, the relay sub-frame is indicated as the Multicast Broadcast Single Frequency Network (abbreviated as MBSFN) sub-frame, and the Rel-8 UE can skip these sub-frames, thus guarantying the backward compatibility with the Rel-8 UE when completing the base station—relay station communication. In the LTE-A system, the structure of the relay sub-frame is shown in FIG. 3.

The Relay Node sends the control information to the subordinate UE in the first 1 or 2 OFDM symbols of the relay sub-frame, and then after a transfer time interval switching from the sending state to the accepting state, it receives the downlink data information of the relay link from the base station. Because the relay station does not receive the Physical Downlink Control Channel (abbreviated as PDCCH), then one physical signal channel R-PDCCH (Relay-PDCCH, relay link PDCCH) needs to be redefined in the relay link used for the transmission of the downlink control information of the relay link.

Now in the discussion of the 3GPP LTE-A related technology, the discussion about the details of the R-PDCCH, such as, the resource element group (REG), etc., has not been fully developed yet. Therefore, how to determine to generate an effective REG of the relay link physical downlink control channel (R-PDCCH) becomes a technical problem which needs to be solved.

SUMMARY OF THE INVENTION

The technical problem that the present document needs to solve is to provide a method and apparatus for determining a relay link resource element group, used to solve the problem that there is not a backward compatible relay link resource element group at present and it is unable to send the relay link downlink control information.

In order to solve the above-mentioned technical problem, the present document provides a method for determining a relay link resource element group, comprising:

determining a size of the relay link resource element group according to a pattern of a non-zero-power Channel State Information Reference Signal (CSI-RS), and/or a pattern of a zero-power CSI-RS and/or a pattern of a Common Reference Signal (CRS) in allocated resources, and/or a pattern of a Demodulation Reference Signal (DMRS) transmitted in a resource block in which the resource element group locates; wherein, the allocated resources are used for transmitting a relay link physical downlink control channel, include one or more continuously or discretely distributed resource blocks in a frequency domain, and include one or more Orthogonal Frequency Division Multiplexing (OFDM) symbols in a time domain.

Alternatively, when determining the size of the resource element group according to the pattern of the non-zero-power CSI-RS and/or the pattern of the zero-power CSI-RS in the allocated resources, the size of the resource element group is determined all according to a pattern of a CSI-RS with 8 ports.

Alternatively, determining the size of the resource element group according to the pattern of the CSI-RS with 8 ports refers to that all resource elements in the pattern of the CSI-RS with 8 ports are not used for data mapping of the resource element group.

Alternatively, when there is only the Common Reference Signal (CRS) transmitted in the OFDM symbol of the allocated resources, the size of the resource element group located in the OFDM symbol is determined as 6 continuous resource elements; and when there is not any reference signal transmitted in the OFDM symbol of the allocated resources, the size of the resource element group located in the OFDM symbol is determined as 4 continuous resource elements.

Alternatively, when the size of the resource element group is determined all according to the pattern of the CSI-RS with 8 ports, the resource element group in the allocated resources is located in one OFDM symbol; when there is a non-zero-power CSI-RS and/or a zero-power CSI-RS in the OFDM symbol, and:

when the number of the 8-port CSI-RS patterns corresponding to the non-zero-power CSI-RS pattern and/or the zero-power CSI-RS pattern in the OFDM symbol is 1 in total, the size of the resource element group in the OFDM symbol is determined as 6 continuous resource elements, wherein, the 6 continuous resource elements include 4 available resource elements;

when the number of the 8-port CSI-RS patterns corresponding to the non-zero-power CSI-RS pattern and/or the zero-power CSI-RS pattern in the OFDM symbol is 2 in total, the size of the resource element group in the OFDM symbol is determined as 12 continuous resource elements, wherein, the 12 continuous resource elements include 4 available resource elements;

when the number of the 8-port CSI-RS patterns corresponding to the non-zero-power CSI-RS pattern and/or the zero-power CSI-RS pattern in the OFDM symbol is 3 in total, it is determined that no resource element group mapping is in the OFDM symbol; and the available resource elements are used for data mapping of the resource element group.

Alternatively, the above-mentioned method further comprises:

determining the number of the resource element groups in the relay link according to the size of the resource element group and the allocated resources.

Alternatively, the above-mentioned method further comprises:

mapping the resource element group to the allocated resources in an order of first a time direction then a frequency direction.

The present document further provides a method for mapping a relay link resource element group, comprising:

taking a resource element group as a mapping element, and mapping the resource element group to allocated relay link physical downlink control channel resources in an order of first a time direction first then a frequency direction; wherein, the relay link physical downlink control channel resources include one or more continuously or discretely distributed resource blocks in a frequency direction, and include Orthogonal Frequency Division Multiplexing (OFDM) symbols available for a relay link in one slot in a time direction.

The present document further provides an apparatus for determining a relay link resource element group, comprising:

a transmission Channel State Information Reference Signal obtaining module, configured to: obtain a pattern of a non-zero-power Channel State Information Reference Signal (CSI-RS) in an Orthogonal Frequency Division Multiplexing (OFDM) symbol in which the resource element group locates;

a Channel State Information Reference Signal muting configuration obtaining module, configured to: obtain configuration information of a zero-power CSI-RS in the OFDM symbol in which the resource element group locates, and determine a pattern of the zero-power CSI-RS based on the configuration information;

a Common Reference Signal obtaining module, configured to: obtain a pattern of a Common Reference Signal (CRS) transmitted in the OFDM symbol in which the resource element group locates;

a Demodulation Reference Signal obtaining module, configured to: obtain a pattern of a Demodulation Reference Signal (DMRS) transmitted in the resource block in which the resource element group locates; and a resource element group size determination module, configured to: determine a size of the resource element group according to the pattern of the non-zero-power CSI-RS, and/or the pattern of the zero-power CSI-RS, and/or the pattern of the CRS in the OFDM symbol in which the resource element group locates, and/or the pattern of the DMRS transmitted in the resource block in which the resource element group locates.

Alternatively, the resource element group size determination module is configured to: when determining the size of the resource element group according to the pattern of the CSI-RS in the OFDM symbol in which the resource element group locates, determine the size of the resource element group according to a pattern of a CSI-RS with 8 ports;

wherein, the pattern of the CSI-RS is the pattern of the non-zero-power CSI-RS in the OFDM symbol in which the resource element group locates and/or the pattern of the zero-power CSI-RS in the located OFDM symbol in which the resource element group locates.

Alternatively, the resource element group size determination module is configured to: determine that the resource elements in the pattern of the CSI-RS with 8 ports are not used for data mapping of the resource element group.

Alternatively, the resource element group size determination module is configured to:

when there is only the Common Reference Signal (CRS) transmitted in the OFDM symbol of the allocated resource, the size of the resource element group located in the OFDM symbol is determined as 6 continuous resource elements; and when there is not any reference signal transmitted in the OFDM symbol of the allocated resource, the size of the resource element group located in the OFDM symbol is determined as 4 continuous resource elements.

Alternatively, the resource element group size determination module is configured to:

when the number of the 8-port CSI-RS patterns corresponding to the non-zero-power CSI-RS pattern and/or the zero-power CSI-RS pattern in the OFDM symbol is 1 in total, determine the size of the resource element group in the OFDM symbol as 6 continuous resource elements, wherein, the 6 continuous resource elements include 4 available resource elements;

when the number of the 8-port CSI-RS patterns corresponding to the non-zero-power CSI-RS pattern and/or the zero-power CSI-RS pattern in the OFDM symbol is 2 in total, determine the size of the resource element group in the OFDM symbol as 12 continuous resource elements, wherein, the 12 continuous resource elements include 4 available resource elements;

when the number of the 8-port CSI-RS patterns corresponding to the non-zero-power CSI-RS pattern and/or the zero-power CSI-RS pattern in the OFDM symbol is 3 in total, determine that no resource element group mapping is in the OFDM symbol;

wherein, the available resource elements are used for data mapping of the resource element group.

The above-mentioned method and apparatus for determining the relay link resource element group and the method for mapping the determined resource element group have solved the determination and mapping problem of the relay link resource element group. When the downlink control information is transmitted over the relay link, the bearer of the control information can be performed according to the REG directly. The design of the REG described by the present document fully considers the design of the REG when the CRS, CSI-RS and the DMRS occur in the relay link, there is a relatively small change for the existing protocol, and there is a good backward compatibility, thus solving the problem of sending the relay link downlink control information.

BRIEF DESCRIPTION OF DRAWINGS

FIG. 4 is a diagram of a pattern of a CSI-RS with 8 ports with a normal CP length of a LTE-A system;

FIG. 5 is a diagram of a pattern of a CSI-RS with 4 ports with a normal CP length of a LTE-A system;

PREFERRED EMBODIMENTS OF THE INVENTION

Figure 1:
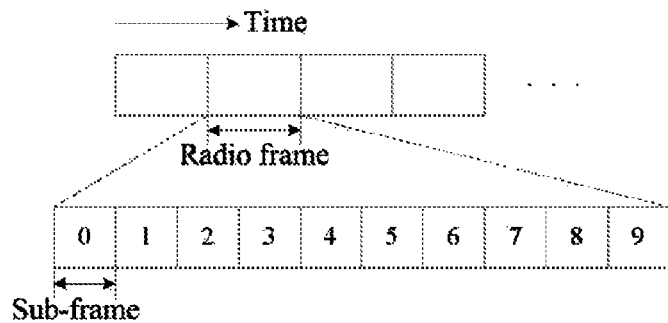
FIG. 1 is a diagram of a frame structure of a LTE/LTE-A system.
Figure 2:
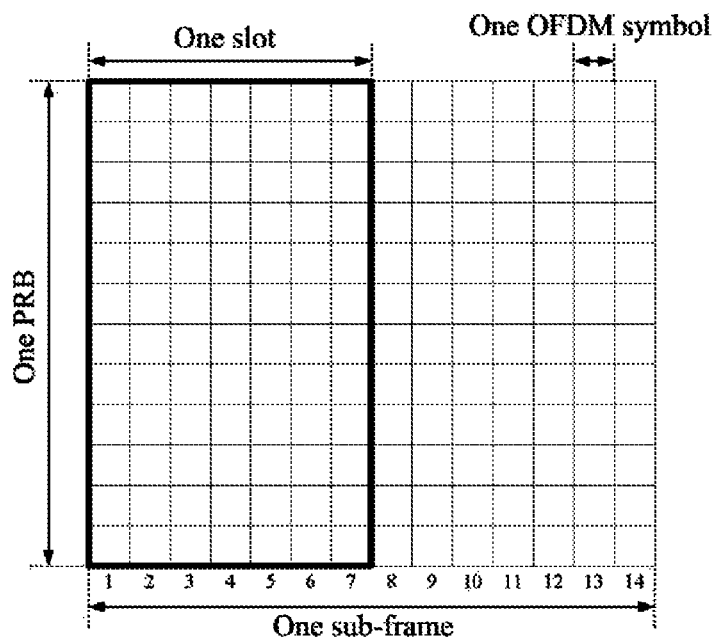
FIG. 2 is a diagram of a resource block structure of a LTE/LTE-A system.
Figure 3:
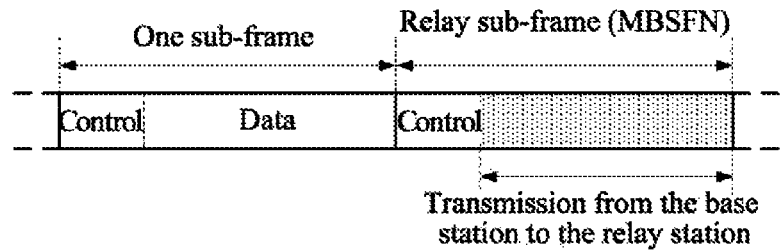
FIG. 3 is a diagram of a downlink relay sub-frame (Un sub-frame) of a LTE-A system.

The embodiments of the present document are described in detail with reference to the accompanying drawings hereinafter. It should be illustrated that, in a case of not conflicting, the embodiments in the present application and features in these embodiments can be combined with each other.

In the LTE/LTE-A system, one PDCCH is transmitted in one or several continuous Control Channel Elements (abbreviated as CCE), and the CCEs in one sub-frame perform the resource mapping after interleaving. The unit interleaved by the CCE is the Resource Element Group (abbreviated as REG). Depending on the transmission situation of the common reference signal (the Cell-specific Reference Signal, or called the common reference signal, abbreviated as CRS), the size of the REG is 4 or 6 continuous REs, and every REG includes 4 effective REs.

The transmission resources of the R-PDCCH locate in the business domain of the Rel-8 system, so the new Channel State Information Reference Signal (or called the channel measurement reference signal, abbreviated as CSI-RS) of ports whose greatest number can be up to 8 discussed in the Rel-10 may locate in the R-PDCCH domain, and even the Demodulation Reference Signal (abbreviated as DMRS, also called UE-specific reference signal, abbreviated as UE-specific RS) also may locate in the R-PDCCH domain. For the above-mentioned reasons, it is resulted that the design and transmission of the REG of the R-PDCCH may not continue to use the current design and transmission method of the REG of the PDCCH directly.

The design of the relay link resource element group (REG) is different from the design of the REG of the PDCCH in the Rel-8 edition. The REG of the relay link has its specific aspects, for example, it needs to consider the transmission of the CSI-RS, the DMRS transmission etc. The REG design method of the present document has a relatively small modification to the existing protocol. When the downlink control information is transmitted over the relay link, the control information is beard just according to the determined REG directly.

Figures 4, 5:
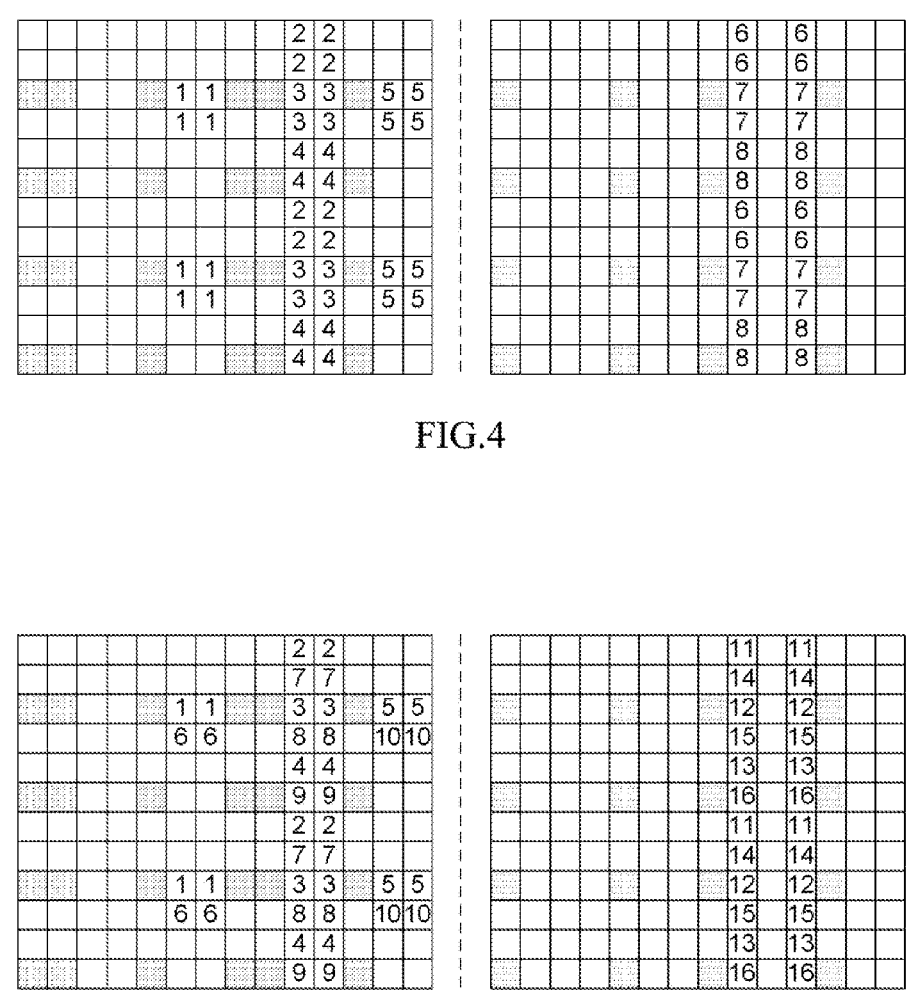

In the Rel-10, the channel measurement reference signal (CSI-RS) is introduced, which is mainly used for the measurement of the down link channel condition. When determining that the sub-frame has the normal cyclic prefix (normal CP), the patterns of the CSI-RS with 4 ports and 8 ports in a RB pair are shown as FIG. 4 and FIG. 5 respectively. The same figure mark in FIG. 4 and FIG. 5 represents an identical CSI-RS pattern, that is:

16 CSI-RS patterns (numbered as 1~16) are supported totally when there are 4 ports, as shown in FIG. 5;

8 CSI-RS patterns (numbered as 1~8) are supported totally when there are 8 ports, as shown in FIG. 4.

In FIG. 4 and FIG. 5, the CSI-RS pattern shown in the left side separated by the dash line is a pattern which should be supported by both the Frequency Division Dual (abbreviated as FDD) and the Time Division Dual (abbreviated as TDD) systems, and the right side separated by the dash line is a pattern which must be supported by the TDD system and is optional for the FDD.

Figure 6:
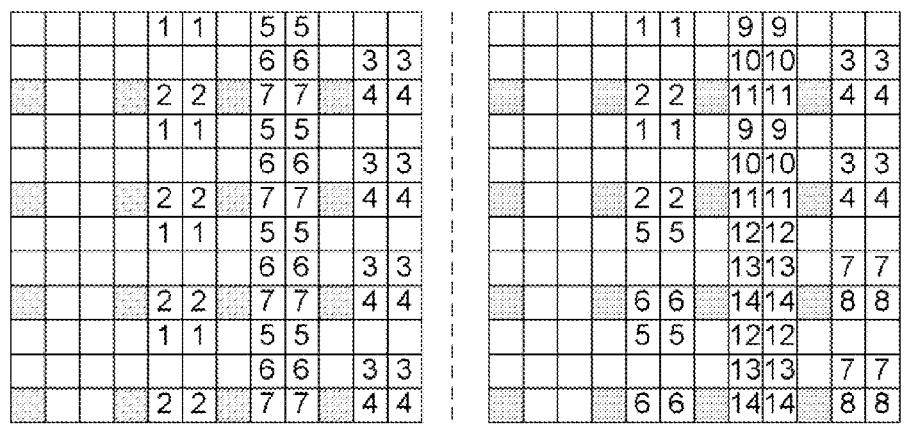
FIG. 6 is a diagram of patterns of a CSI-RS with 8 ports and 4 ports with an extended CP length of a LTE-A system.

The CSI-RS pattern with the length of the extended cyclic prefix is shown in FIG. 6, the left side separated by the dash line is the pattern of the CSI-RS with 8 antenna ports, and the right side is the pattern of the CSI-RS with 4 antenna ports. Wherein, the patterns on 7 or 8 OFDM symbol (that is, the CSI-RS patterns 5~7 when there are 8 ports and the CSI-RS patterns 9~14 when there are 4 ports) are optional for the FDD and required for the TDD, while other patterns are required for both the FDD and the TDD.

The sub-frame position sent by the CSI-RS is configurable, and in a sent sub-frame, the CSI-RS is transmitted in the full bandwidth. In order to avoid the interference between the CSI-RSs sent in the adjacent cells, generally, the adjacent cells will be configured to use different CSI-RS patterns to perform the transmission of the CSI-RS. Taking the normal CP length shown in FIG. 4 as an example, assuming that cell 1 and cell 2 are adjacent and the CSI-RSs' are transmitted with 8 ports, the cell 1 is configured to use the CSI-RS pattern 1 at the left side separated by the dash line in FIG. 4, and the cell 2 is configured to use the CSI-RS pattern 2 at the left side; in this way, there is no mutual interference of the CSI-RS between the two cells. However, because of an adoption of some special technologies, only guaranteeing that the CSI-RSs' of different cells locate at different resource locations may not guarantee that the transmission of the CSI-RS is not interfered, and then it needs to perform muting processing at this moment. The so-called muting refers to that the cell 1 is configured to not send any information in some REs, while these REs may be the positions where the cell 2 transmits the CSI-RS. A specific muting RE is generally shown by the CSI-RS pattern, and is also called the zero-power CSI-RS, and the corresponding transmitted CSI-RS is called the non-zero-power CSI-RS. For example, the cell 1 is configured with muting at the RE corresponding to the CSI-RS pattern 2 in FIG. 5. When muting is configured, the muting can be configured at the REs corresponding to a plurality of patterns of the CSI-RS at the same time. Whether muting is performed when transmitting the control information of the relay link is not discussed at present.

The CSI-RS patterns shown in FIG. 4-FIG. 6 are the CSI-RS patterns when transmitting through 8 ports and 4 ports. The CSI-RS will support the configuration of 1, 2, 4, 8 antenna ports at present. The nested pattern is adopted when the number of the configured CSI-RS ports is less than 4, that is, if the CSI-RS is configured to send through 2 ports, then the CSI-RSs with 2 ports are sent at the resources corresponding to 2 ports in the 4 port patterns, which is in a similar way to the CSI-RS patterns relationship with 4 ports and 8 ports as shown in the picture. The number of the patterns will be double, for example, with the normal CP, there are 16 patterns of the CSI-RS with 4 ports, and there are 32 patterns of the CSI-RS with 2 ports. The CSI-RS pattern of 1 port is the same as the CSI-RS patterns with 2 ports. The RE, where the CSI-RS is not transmitted, in the CSI-RS pattern will be used for the data transmission.

Figure 7:
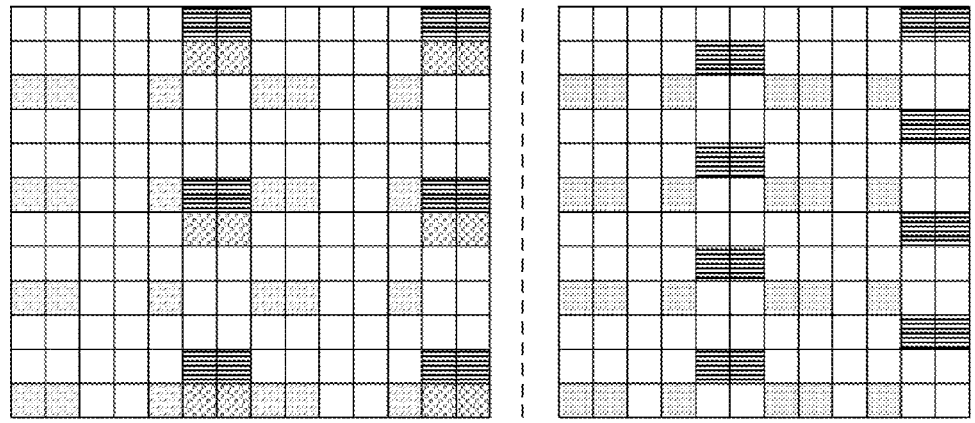
FIG. 7 is a diagram of patterns of DMRS with a normal CP and an extended CP of a LTE/LTE-A system.

Also the Demodulation Reference Signal (DMRS, also called UE-specific RS) is introduced in the Rel-10 at the same time, which is mainly used for the demodulation of the business data transmission. For the relay link, the determined DMRS pattern when the sub-frame adopts the normal CP length at present is shown as the left side of the dash line in FIG. 7. For the situation of the normal CP length, when the number of the transport layers is less than or equal to 2, the represented DMRS patterns are filled with ▤ or ▨ in the figure; these two kinds of patterns are adopted simultaneously when the number of the transport layers is greater than 2. That is, when the number of the transport layers is less than or equal to 2, the overhead of the DMRS is 12 REs in each RB pair, and it is 24 REs in each RB when the number of the transport layers is greater than 2. In the Rel-10, the DMRS with the extended CP only supports the transmission with the greatest number of the layers being 2, as shown at the right side of the dash line in FIG. 7. The DMRS is generally transmitted only in the RB with the service scheduling. In addition, when the relay station does not receive the last OFDM symbol of the downlink relay sub-frame, the DMRS of the relay link is not mapped in the second slot.

For the relay link physical downlink control channel (R-PDCCH), its transmission frequency domain location is generally only a part of the system bandwidth. And, for the Downlink grant information (abbreviated as DL grant) used for scheduling the downlink service transmission, it will only be transmitted in the first slot of the sub-frame, and the Uplink grant information (abbreviated as UL grant) used for scheduling the uplink service transmission is only transmitted in the 2nd slot of the sub-frame. In the present embodiment, when the relay link resource element group (REG) is designed, it can be limited to locate in an OFDM symbol, and the same REG does not cross the RB in the frequency domain, thus guarantying that the relay link control information mapping and the receiving end processing are simple. Meanwhile, the design of the relay link REG in the present embodiment can guarantee that one REG can map the data of 4 REs, thus guarantying the compatibility with the Rel-8 system.

Based on the above-mentioned analysis, a method for determining a relay link resource element group of the present document can be obtained, including the following steps:

A size of a relay link resource element group is determined according to a pattern of a non-zero-power Channel State Information Reference Signal (CSI-RS), and/or a pattern of a zero-power CSI-RS and/or a pattern of a Common Reference Signal (CRS), and/or a pattern of a Demodulation Reference Signal (DMRS) transmitted in a resource block in which the resource element group locates in allocated resources;

the allocated resources are used for a transmission over a relay link physical downlink control channel, include several continuously or discretely distributed resource blocks in a frequency domain, while include several Orthogonal Frequency Division Multiplexing (OFDM) symbols in a time domain.

When the size of the resource element group is determined according to the pattern of the non-zero-power CSI-RS, and/or the pattern of the zero-power CSI-RS in the allocated resources, the size of the resource element group is determined all according to a pattern of a CSI-RS with 8 ports.

When there is only a Common Reference Signal (CRS) transmitted in the OFDM symbol of the allocated resources, the size of the resource element group located in the OFDM symbol is determined as 6 continuous resource elements; and when there is not any reference signal transmitted in the OFDM symbol of the allocated resources, the size of the resource element group located in the OFDM symbol is determined as 4 continuous resource elements.

When the sub-frame in which the allocated resources locate is of a normal cyclic prefix length and there is a Demodulation Reference Signal (DMRS) transmitted in the resource block of the allocated resources, the size of the resource element group in the OFDM symbol with the DMRS transmitted in the resource block is determined according to the pattern of the actually transmitted DMRS, or determined according to the pattern of the DMRS when transmitting with 4 layers by a single user;

when the sub-frame in which the allocated resources locate is of an extended cyclic prefix length and there is a Demodulation Reference Signal (DMRS) transmitted in the resource block of the allocated resources, the size of the resource element group in the OFDM symbol with the DMRS transmitted in the resource block is determined according to the pattern of the actually transmitted DMRS.

When the size of the resource element group is determined all according to the pattern of the CSI-RS with 8 ports, the resource element group in the allocated resources is located in one OFDM symbol; when there is a non-zero-power CSI-RS and/or a zero-power CSI-RS in the OFDM symbol, and:

when the number of the 8-port CSI-RS patterns corresponding to the non-zero-power CSI-RS pattern and/or the zero-power CSI-RS pattern in the OFDM symbol is 1 in total, the size of the resource element group in the OFDM symbol is determined as 6 continuous resource elements, wherein, the 6 continuous resource elements include 4 available resource elements;

when the number of the 8-port CSI-RS patterns corresponding to the non-zero-power CSI-RS pattern and/or the zero-power CSI-RS pattern in the OFDM symbol is 2 in total, the size of the resource element group in the OFDM symbol is determined as 12 continuous resource elements, wherein, the 12 continuous resource elements include 4 available resource elements; and when the number of the 8-port CSI-RS patterns corresponding to the non-zero-power CSI-RS pattern and/or the zero-power CSI-RS pattern in the OFDM symbol is 3 in total, it is determined that no resource element group mapping is in the OFDM symbol.

When there is a Demodulation Reference Signal (DMRS) transmitted in the allocated resources, and when there is the non-zero-power CSI-RS and/or the zero-power CSI-RS in the OFDM symbol by which the Demodulation Reference Signal is transmitted, the resource element group is located in an OFDM symbol:

the size of the resource element group in the OFDM symbol by which the Demodulation Reference Signal is transmitted is determined according to one of the 4 following ways: the greatest number of ports of the CSI-RS and the greatest number of ports of the DMRS; or the actual number of ports of the CSI-RS and the actual number of ports of the DMRS; or the greatest number of ports of the CSI-RS and the actual number of ports of the DMRS; or the actual number of ports of the CSI-RS and the greatest number of ports of the DMRS;

alternatively, it is determined that no resource element group is in the allocated resources.

The number of the resource element groups in the relay link is determined according to the size of the resource element group and the allocated resources. The method further includes: mapping the resource element group to the allocated resources in an order of first a time direction then a frequency direction.

After the size of the REG is determined, based on the determined resource element group, the present document further provides a method for mapping a relay link resource element group, including the following steps:

taking a resource element group as a mapping element, and the resource element group is mapped to allocated relay link physical downlink control channel resources in an order of first a time direction then a frequency direction; wherein, the relay link physical downlink control channel resources include one or more continuously or discretely distributed resource blocks in a frequency direction, while include one Orthogonal Frequency Division Multiplexing (OFDM) symbol available for a relay link in a slot in a time direction.

Based on the above-mentioned method, the apparatus for determining a relay link resource element group includes:

a transmission Channel State Information Reference Signal obtaining module, configured to: obtain a pattern of a non-zero-power Channel State Information Reference Signal (CSI-RS) in an Orthogonal Frequency Division Multiplexing (OFDM) symbol in which the resource element group locates;

a Channel State Information Reference Signal muting configuration obtaining module, configured to: obtain muting configuration information of the CSI-RS in the OFDM symbol in which the resource element group locates, and determine a pattern of the zero-power CSI-RS based on the configuration information;

a Common Reference Signal obtaining module, configured to: obtain a pattern of a Common Reference Signal (CRS) transmitted in the OFDM symbol in which the resource element group locates;

a Demodulation Reference Signal obtaining module, configured to: obtain a pattern of a Demodulation Reference Signal (DMRS) transmitted in the resource block in which the resource element group locates; and a resource element group size determination module, configured to: determine the size of the resource element group according to the pattern of the non-zero-power CSI-RS, and/or the pattern of the zero-power CSI-RS, and/or the pattern of the CRS in the OFDM symbol in which the resource element group locates, and/or the pattern of the DMRS transmitted in the resource block in which the resource element group locates.

The resource element group size determination module, when determining the size of the resource element group according to the pattern of the CSI-RS in the OFDM symbol in which the resource element group locates, determines the size of the resource element group according to a pattern of a CSI-RS with 8 ports;

wherein, the pattern of the CSI-RS is a pattern of the non-zero-power CSI-RS in the OFDM symbol in which the resource element group locates and/or the pattern of the zero-power CSI-RS in the OFDM symbol in which the resource element group locates.

When the sub-frame in which the resource element group locates is of a normal cyclic prefix length and there is only a Demodulation Reference Signal (DMRS) transmitted in the located OFDM symbol, the resource element group size determination module determines the size of the resource element group according to the pattern of the actually transmitted DMRS, or determines the size of the resource element group according to the pattern of the DMRS when transmitting with 4 layers by a single user; when the sub-frame in which the resource element group locates is of an extended cyclic prefix length and there is only the Demodulation Reference Signal (DMRS) transmitted in the located OFDM symbol, the size of the resource element group is determined according to the pattern of the actually transmitted DMRS.

The resource element group is located in a OFDM symbol, there is the Demodulation Reference Signal (DMRS) transmitted in the OFDM symbol corresponding to the resource block in which the resource element group locates, and there is the CSI-RS transmitted and/or the CSI-RS for muting other cells in the OFDM symbol;

then the resource element group size determination module determines the size of the resource element group according to one of the 4 following ways: the greatest number of ports of the CSI-RS and the greatest number of ports of the DMRS; or the actual number of ports of the CSI-RS and the actual number of ports of the DMRS; or the greatest number of ports of the CSI-RS and the actual number of ports of the DMRS; or the actual number of ports of the CSI-RS and the greatest number of ports of the DMRS;

alternatively, the resource element group size determination module determines that no resource element group is in the allocated resources.

In the following description, for convenience, the resources corresponding to one OFDM symbol in one resource block (RB) are called "the resource base group", that is, one resource base group includes 12 sub-carriers in one RB in the frequency domain, while includes one OFDM symbol in the time domain. Naming in this way is for the purpose of simple and convenient of the description of the following embodiments. The specific illustrations are as follows.

Embodiment 1

Figure 8:
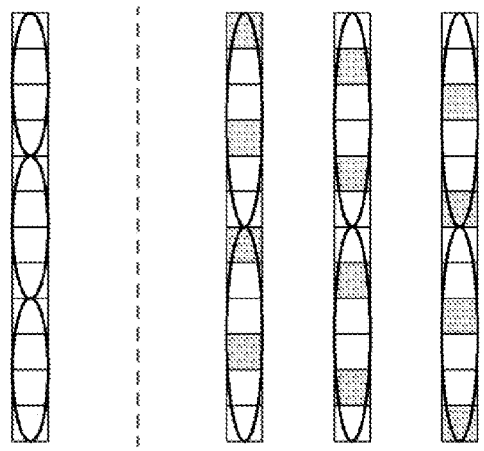
FIG. 8 is a diagram of a REG design according to the embodiment 1 of the present document.

In the present embodiment, assuming that there is not any Reference Signal (RS, that is, there is not any CRS, DMRS, non-zero-power CSI-RS, zero-power CSI-RS) in the resource base group, or there is only the cell-specific reference signal (or called the common reference signal, abbreviated as CRS). In this case, the design of the REG can continue to use the rule of the Rel-8, that is, when there is not any reference signal RS, the size of the REG is 4, shown as the left side separated by the dash line in FIG. 8, that is, the size of the REG is 4 REs; when there is only the CRS in the resource base group, the size of the REG is 6, shown as the right side separated by the dash line in FIG. 8, and when there is only 1 port for the CRS, it is processed following the situation of the CRS with 2 ports, that is, the control channel data are not mapped at the CRS port 1 (port number 0, 1).

Embodiment 2

In the present embodiment, assuming that there is the CSI-RS mapping in the resource base group. The CSI-RS talked about herein can be the CSI-RS sent by the present cell, or the CSI-RS which is configured with muting in the present cell. In the actual design of the REG, it can adopt the way of always assuming that the number of ports of the CSI-RS is the greatest.

Always assuming that the number of ports of the CSI-RS is the greatest refers to that, if it is the CSI-RS sent by the present cell (that is, the non-zero-power CSI-RS), although the actually configured CSI-RS may have 1, 2 or 4 ports, the design of the REG is always performed according to the pattern of the CSI-RS with 8 ports, that is, it is considered to reject the RE occupied by the 8-port CSI-RS when determining the REG size;

if the present cell is configured with muting (there is the zero-power CSI-RS), although the muting may be configured according to the pattern of the CSI-RS with 4 ports, the design of the REG is always performed according to the pattern of the CSI-RS with 8 ports. For example, for 5 patterns of the CSI-RS with 8 ports shown as the left side in FIG. 4, if the RE in a certain CSI-RS pattern is used for the CSI-RS transmission or is configured with muting at the RE, then all the REs occupied by the CSI-RS pattern will be rejected when designing the REG, that is, it is not used for mapping the REG data.

Figure 9:
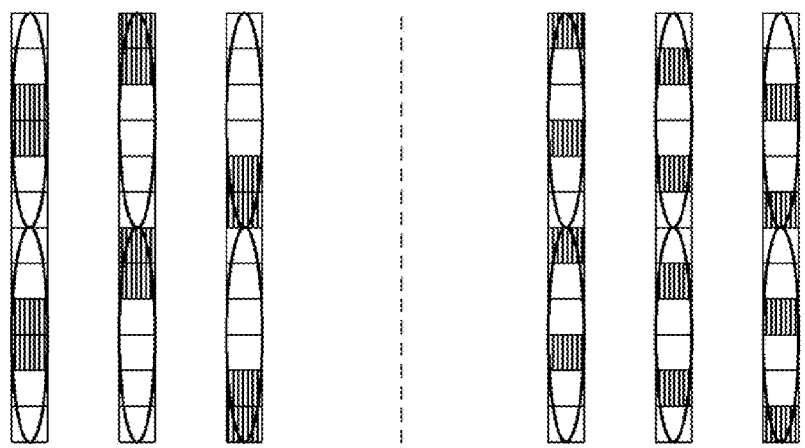
FIG. 9-11 are diagrams of a REG design according to the embodiment 2 of the present document.

When the number of the 8-port CSI-RS patterns corresponding to the transmitted CSI-RS (that is, non-zero-power CSI-RS) or the configured muting (that is, the zero-power CSI-RS) in the OFDM symbol in which the resource base group locates is one in total, assuming that the number of ports of the CSI-RS is the greatest, there are 8 available REs left, so the size of the REG can be designed as 6. The meaning that the number of the corresponding 8-port CSI-RS patterns is one in total is explained hereinafter. For example, when the sub-frame has a normal CP, the CSI-RS transmitted in the present cell is with 8 ports, and there is no muting, and the number of the pattern of the corresponding CSI-RS with 8 ports is one; or the CSI-RS transmitted in the present cell is with 4 ports, such as the CSI-RS pattern 2 in FIG. 5, and there is no CSI-RS which is configured with muting in the OFDM symbol in which the pattern 2 locates, then the transmitted CSI-RS pattern corresponds to 1 pattern of the CSI-RS with 8 ports, that is, the CSI-RS pattern 2 in FIG. 4; or the CSI-RS transmitted in the present cell is with 4 ports, such as the CSI-RS pattern 1 in FIG. 5, and the muting is configured at the RE corresponding to the CSI-RS pattern 6 in the present cell at the same time, that is, although there is the CSI-RS transmitted and the muting configuration of the CSI-RS at the same time, there is only one pattern of the CSI-RS with 8 ports corresponding to the transmitted CSI-RS and the RE configured with muting, that is, the CSI-RS pattern 1 in FIG. 4. Other situations can be done in the same manner. It is the same for the extended CP length. In the above-mentioned cases, there are 8 REs left in all the resource base groups for the REG data mapping, as shown in FIG. 9. Wherein, the 3 resource base groups on the left side of the dash line represent the REG determined with the normal CP length, and the 3 resource base groups on the right side of the dash line represent the REG determined with the extended CP length. The area filled by  in FIG. 9 represents the CSI-RS pattern in a resource base group, while the ellipse shows that those REs enclosed in the ellipse correspond to one REG.

Figure 10:
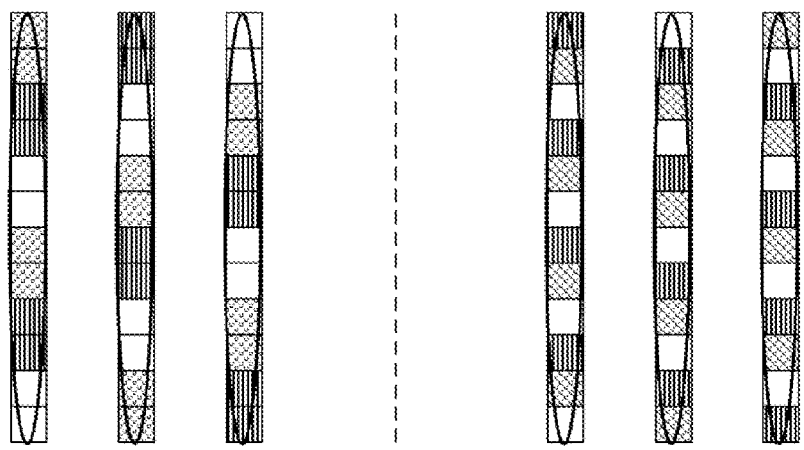
Figure 11:

When the number of the 8-port CSI-RS patterns corresponding to the transmitted CSI-RS and/or the RE of muting in the OFDM symbol in which the resource base group locates is two in total, assuming that the number of ports of the CSI-RS is the greatest, there are 4 available REs left, so the size of the REG can be designed as 12, that is, one resource base group is one REG, as shown in FIG. 10. Wherein, 3 resource base groups in the left side represent the situation of the normal CP, and 3 resource base groups in the right side represent the situation of the extended CP. The same kind of design filling in the picture belongs to the same pattern of the CSI-RS with 8 ports ( and ). The meaning that the number of the corresponding 8-port CSI-RS patterns is 2 in total can be analogized according to the description for the number of the corresponding 8-port CSI-RS patterns being 1 in total in the above segment, which will not be described in details anymore here.

In the case of the extended CP, when the number of the 8-port CSI-RS patterns corresponding to the transmitted CSI-RS and/or the muting in the OFDM symbol in which the resource base group locates are two in total, the REG may not be mapped in the resource base group either. For some data transmission modes (such as the transmission diversity, which mainly refers to the space-frequency blocking code, abbreviated as SFBC, in the LTE downlink), its decoding algorithm may need to average the channel responses of the adjacent modulation symbols, while with the extended CP, the interval of the available resources of the REG in the frequency direction is relatively large (the 3 resource base groups on the right side in FIG. 10, of which the interval is 2 REs), that is, the difference of the channel responses of the adjacent modulation symbols may be relatively large, and the averaging may influence the date demodulation performance. Therefore, for the extended CP, when the number of the 8-port CSI-RS patterns corresponding to the transmitted CSI-RS and/or the muting in the OFDM symbol in which the resource base group locates are two in total, it also can be stipulated that there is no REG in such a resource base group.

When the number of the 8-port CSI-RS patterns corresponding to the transmitted CSI-RS and the muting in the OFDM symbol in which the REG base group locates are three in total, there is not RE which can be used for REG data mapping under the assumption of the present embodiment, so there is no REG in such a resource base group.

Embodiment 3

The present embodiment considers the situation that there is a DMRS in the resource base group. Because the control and service may be multiplexed and transmitted in the same physical resource block pair (PRB pair), there may be a DMRS in the resource base group used for the demodulation of the service data. When there is a DMRS in the resource base group, the design of the REG in the resource base group should consider the RE occupied by the DMRS, so as to avoid the mutual conflict of the two parties. In the actual design of the REG, there can be two ways as described in 3.1 and 3.2.

3.1 Always Assuming that the Number of Ports of the DMRS is the Greatest the DMRS is used for the demodulation of the service data, and the number of its transmission ports (or called the number of layers) is same with the number of the actual data transport layers. Always assuming that the number of ports of the DMRS is the greatest refers to, although the number of the actual DMRS transmission ports may not be greater than 2, the design of the REG is always performed according to the assumption that the number of the DMRS ports in the pattern is greater than 2. For example, in the case that the sub-frame is of the normal CP length, assuming that the DMRS is transmitted through 2 ports, the indicated DMRS pattern is filled with ▤ on the left side in FIG. 7, that is, the overhead of the DMRS in the resource base group containing the DMRS is 3 REs, but when designing the REG, it is assumed that the indicated DMRS patterns is filled with ▤ and ▨, that is, it is assumed that the overhead of the DMRS in the resource base group containing the DMRS are 6 REs.

Figure 12:
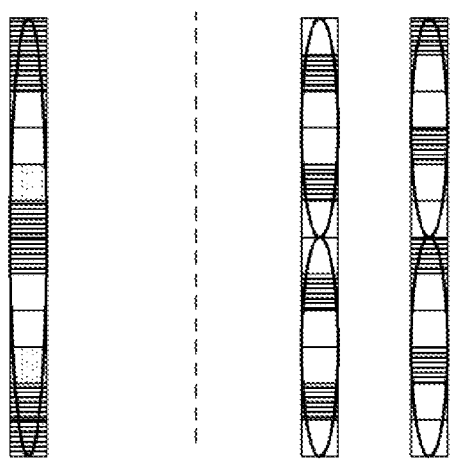
FIG. 12-13 are diagrams of a REG design according to the embodiment 3 of the present document.

Under that assumption, when the sub-frame is of the normal CP length, the remained RE besides the DMRS in the resource basic group through which the DMRS is transmitted is not enough to bear the control data of 2 REGs, so the size of the REG is designed to be 12, that is, the whole resource basic group is a REG. In this way, after mapping the REG, there are 2 unoccupied REs in each resource base group, shown as ▤ filling in FIG. 12. Wherein, the ▤ filling represents a DMRS pattern in one resource base group. It should be understood that the positions of the 2 unoccupied REs ▤ described herein are only exemplary.

Under that assuming, when the sub-frame is of the extended CP length, the DMRS of the current Rel-10 only supports a 2-ports-transmission at most, that is, the situation that the overheads of the DMRS are different when the number of the transport layers is different does not exist. Besides the DMRS, there are 8 REs that can bear the REG in each resource base group, so the size of the REG is designed to be the size of 6 continuous REs, which is shown as the right side separated by the dash line in FIG. 12.

Always assuming that the number of ports of the DMRS is the greatest avoids that the REG size changes with the change of the number of the DMRS ports when there is the DMRS, and avoids that the complexity of the blind detection rises, and the processing is relatively ease on the sending end and the receiving end.

Figure 13:

3.2 Processing According to the Actual DMRS Ports when the sub-frame is of the normal CP length, it also can be processed according to the number of the actual DMRS ports. When the number of the DMRS transmission ports is less than or equal to 2, the DMRS occupies 3 REs in the resource base group mapped with the DMRS, that is, there are still 9 REs which can be used for REG data mapping. In this case, the REG in the REG basic group can be designed to be the size of 6 continuous REs, as shown in FIG. 13. In this case, one RE will not be occupied by the data transmission, shown as the ▤ filling in FIG. 13. It should be understood that the position of the 1 unoccupied RE ▤ described herein is only exemplary.

When the number of the DMRS transmission ports is greater than 2, the DMRS occupies 6 REs in the resource base group mapped with the DMRS. In this case the REG can be designed according to the description of part 3.1 in the present embodiment, shown as the left side of FIG. 12.

The REG is determined according to the number of the actual DMRS ports, which can improve the resource utilization rate and avoid the wasting of resources when the sub-frame is of the normal CP length.

Embodiment 4

The present embodiment considers the situation that there are the CSI-RS and the DMRS in the resource base group at the same time. Because the control and service may be multiplexed and transmitted in the same physical resource block pair (PRB pair), there may be a DMRS in the resource base group used for the demodulation of the service data. There is the CSI-RS transmission for the sub-frame as well at the same time, and the CSI-RS transmission described herein also includes the configuration of the muting. When there are the CSI-RS and the DMRS in the resource base group at the same time, the design of the REG in the resource base group should consider the RE occupied by the CSI-RS and the DMRS, so as to avoid the mutual conflict of the reference signal and the REG data. When determining the size of the REG in practice, there can be two ways, as described in the two parts 4.1 and 4.2.

4.1 Always Assuming that the Number of Ports of the CSI-RS is the Greatest

Always assuming that the number of ports of the CSI-RS is the greatest refers to that, like the description in embodiment 2, if it is the CSI-RS sent by the present cell, although the CSI-RS is configured for transmission with 1, 2 or 4 ports, the determination of the REG is always performed according to the pattern of the CSI-RS with 8 ports; if the present cell is configured with muting, although the muting may be configured according to the pattern of the CSI-RS with 4 ports, the determination of the REG is always performed according to the pattern of the CSI-RS with 8 ports. That is, the RE occupied by the CSI-RS with 8 ports is considered to be deleted when determining the REG size. For the DMRS, there are two kinds of processing ways as well.

4.1-1 Always Assuming that the Number of Ports of the DMRS is the Biggest

As described in the above-mentioned embodiment 3, when the sub-frame is of the normal CP length, it is always assumed that the number of the DMRS transmission layers is greater than 2 when there is a DMRS in the resource basic group, that is, 6 REs are occupied in the resource basic group. On the premise of assuming that the number of ports of the CSI-RS is the greatest at the same time, there are 2 REs remained besides the RS in the resource base group which maps the CSI-RS and the DMRS at the same time, that is, it is not enough for mapping the data of one REG. In this case, the REG is not mapped in the resource base group.

Figure 14:
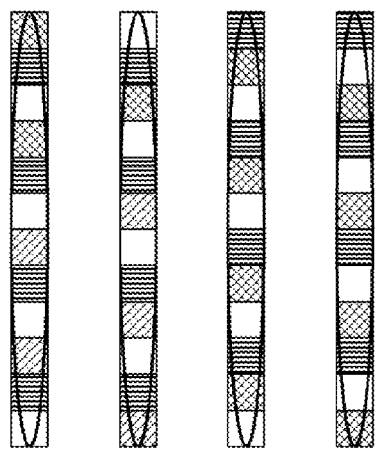
FIG. 14-19 are diagrams of a REG design according to the embodiment 4 of the present document.

When the sub-frame is of the extended CP length, the DMRS of the Rel-10 only supports 2 ports at most for transmitting at present, that is, the situation that the overheads of the DMRS are different when the number of the transport layers is different does not exist. The overhead of the DMRS in one resource basic group are 4 REs. On the premise of always assuming that the number of ports of the CSI-RS is the greatest, when the number of the patterns of the transmitted CSI-RS or the patterns of the CSI-RS with 8 ports corresponding to the RE of muting in the resource base group is only 1, there are 4 REs which can be used for the REG in the resource base group, so the size of the REG can be designed as 12, that is, one resource base group is one REG, as shown in FIG. 14. Wherein, the ▇ filling represents the DMRS pattern, and the ⊠ filling represents the CSI-RS pattern.

In the above-mentioned case, the REG may be not mapped in the resource base group either, as described in embodiment 2. When the number of the 8-port CSI-RS patterns corresponding to the transmitted CSI-RS and the RE of muting in the OFDM symbol in which the resource base group locates is 2 in total, there is no RE which can be used for the REG data transmission on the premise of assuming that the number of ports of the CSI-RS is the greatest and the number of ports of the DMRS is the greatest, so there is no REG mapping in such a resource base group.

4.1-2 Processing According to the Actual Number of Ports of the DMRS

As described in the above-mentioned embodiment 3, when the sub-frame is of the normal CP length, and when the resource base group contains the DMRS, the number of REs occupied by the DMRS varies since the number of ports of the RE varies: when the number of the DMRS transmission ports is less than or equal to 2, the overhead of the DMRS in the resource basic group containing the DMRS are 3 REs; when the number of the DMRS transmission ports is greater than 2, the overhead of the DMRS in the resource basic group containing the DMRS are 6 REs.

Figure 15:

On the premise of assuming that the number of ports of the CSI-RS is the greatest, when the number of the DMRS transmission ports is less than or equal to 2, there are 5 REs remained besides the RS in the resource basic group which maps the CSI-RS and the DMRS at the same time, and the data of one REG can be mapped. That is, the size of the REG is determined as 12 REs, as shown in FIG. 15 (wherein, the ▇ filling represents the DMRS pattern, the ⊠ filling represents the CSI-RS pattern, and the ▤ filling shows that the RE does not map the data); when the number of the DMRS transmission ports is greater than 2, there are 3 REs remained besides the RS in the resource basic group which maps the CSI-RS and the DMRS at the same time, that is, the remained RE is not enough to map the data of one REG. In this case, no REG is mapped in the resource base group.

4.2 Processing According to the Actual Number of Ports of the CSI-RS

The size of the REG can also be determined based on the actual number of the CSI-RS transmission ports. The actual number of the CSI-RS transmission ports mentioned herein also includes the number of ports of the CSI-RS pattern corresponding to the RE of muting when the muting is configured. When there are DMRSs coexisting in the resource base group, there are two kinds of processing ways.

4.2-1 Always Assuming that the Number of Ports of the DMRS is the Greatest

Figure 16:
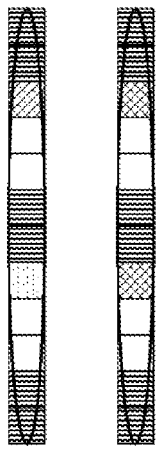

That is to say, when the sub-frame is of the normal CP length, it is always assumed that the number of the DMRS transmission ports is greater than 2 when there is a DMRS in the resource basic group, that is, 6 REs are occupied by the DMRS in the resource basic group. On the premise of CSI-RSs coexisting in the resource basic group and determining the REG according to the actual number of ports of the CSI-RS, the specific principle can be summarized as that: the size of the REG in the resource basic group should guarantee that each REG can bear 4 effective REs, and it should make the number of the wasted REs as little as possible. When the number of the CSI-RS transmission ports is 1, 2 or 4, the CSI-RS occupies 1 or 2 REs in the resource base group. Adding the overhead of 6 REs of the DMRS, 5 or 4 REs are remained available in the resource base group. The size of the REG can be designed as 12 at this time, as shown in FIG. 16 (which shows the situation of recourses occupancy when the CSI-RS is transmitted with 2 ports or 4 ports respectively: the ▇ filling represents the DMRS pattern, the ⊠ filling represents the CSI-RS pattern, and the filling ▤ shows that the RE does not map the data). When the number of the CSI-RS transmission ports or the number of CSI-RS pattern ports corresponding to the RE of muting is 8, no REG is mapped in the resource base group.

When the sub-frame is of the extended CP length, the DMRS of the Rel-10 only supports 2 ports at most to transmit at present, that is, the situation that the overheads of the DMRS are different when the number of the transport layers is different does not exist. The overhead of the DMRS in one resource basic group are 4 REs. On the premise of determining the REG according to the number of the actual CSI-RS ports, the REG size determination principle can be summarized as: the size of the REG should guarantee that each REG can bear 4 effective REs, and it should make the number of the wasted REs as little as possible. Specifically, assuming that, for the OFDM symbol in which the REG locates, the OFDM symbol is in the resource of one RB; the number of the REs occupied by the transmitted CSI-RS is N1, the number of the REs of muting is N2, the number of the REs for the overhead of the DMRS are N3, and then when 4<N1+N2+N3≤8, the size of the REG is 12; when N1+N2+N3>8, there is no REG mapped in the resource base group, wherein, N3=4.

Figure 17:

For example, when the sub-frame is of the extended CP, assuming that the CSI-RS transmitted with 4 ports is configured in a certain resource basic group and the muting is configured in the OFDM symbol in which the CSI-RS locates at the same time, then the CSI-RS patterns corresponding to the RE of muting RE is with 4 ports, as shown in FIG. 17. The ⊠ filling represents the RE in which the transmitted CSI-RS with 4 ports locates in the present cell, the ⊞ filling represents the RE of muting in the present cell, that is, no information is sent in the place of ⊞ in the present cell, and the ▤ filling represents that the DMRS occupies the RE. In this way, there are 4 REs remained available in the resource base group besides the RE occupied by the CSI-RS in the present cell and the RE occupied by the CSI-RS of muting of other cells, and the RE occupied by the DMRS, as shown in FIG. 17. The size of the REG can be designed as 12 according to the method of the present document, that is, there is one REG in the resource base group, shown as the ellipse in FIG. 17.

4.2-2 Processing According to the Actual Number of Ports of the DMRS

The REG can be designed according to the number of the REs occupied by the DMRS and the CSI-RS actually. The design principle of the REG can be summarized as: the size of the REG should guarantee that each REG can bear 4 effective REs, and it should make the number of the wasted REs as little as possible. Specifically, assuming that, in one resource base group, the number of the REs occupied by the transmitted CSI-RS is N1, the number of the REs of muting is N2, the number of the REs for the overhead of the DMRS are N3, and then when 0<N1+N2+N3≤4, the size of the REG is 6; when 4<N1+N2+N3≤8, the size of the REG is 12; when N1+N2+N3>8, there is no REG mapped in the resource base group.

Figure 18:

For example, assuming that the sub-frame is of normal CP length, there coexist the CSI-RS and the DMRS in the resource base group, and the CSI-RS is with 4 ports and the DMRS is also with 4 ports, as shown in FIG. 18. In this way, there are 4 REs remained available in one resource base group, and the size of the REG in the resource base group can be designed as the size of 12 REs. The ▤ represents that the DMRS occupies the RE, and the ⊠ represents that the CSI-RS occupies the RE, as shown in the figure. The CSI-RS mentioned herein can the CSI-RS transmitted in the present cell, or the RE of muting configured in the present cell.

Figure 19:

For example, assuming that the sub-frame is of the extended CP length, there coexist the CSI-RS and the DMRS in the resource base group, including the transmitted CSI-RS and the CSI-RS of muting; both of these two CSI-RSs are with 4 ports, and the DMRS is with 2 ports, as shown in FIG. 19. In this way, there are 4 REs remained available in one resource base group besides the CSI-RS, DMRS and the RE of muting, and the size of the REG in the resource base group can be designed as the size of 12 REs. The ▤ represents that the DMRS occupies the RE, the ⊠ represents that the CSI-RS of the present cell occupies the RE, and the ⊞ filling represents the RE of muting in the present cell, that is, the present cell does not send any information at the place of ⊞, as shown in the figure.

When the CSI-RS and the DMRS coexist, besides the above-mentioned four kinds of ways for determining a resource element group, it can be also determined that there is no resource element group in the allocated resources, that is, the resource element group mapping will not be performed.

Embodiment 5

The present embodiment provides a mapping method of the REG. 4 modulation symbols can be mapped in the REG of the present embodiment, and these 4 modulation symbols form a tetrad. The size of the REG may be the size of 4, 6 or 12 REs, but it can only map one tetrad.

The mapping mode of the present embodiment is that, the resource element group (REG) performs the resource mapping in an order of first a time direction then a frequency direction in the resources allocated in the relay physical downlink control channel. The resources allocated in the relay physical downlink control channel mentioned herein include several continuously or discretely distributed resource blocks in a frequency direction, while include Orthogonal Frequency Division Multiplexing (OFDM) symbols available for a relay link in a slot in a time direction.

For example, it may be the 3rd to 6th OFDM symbols in the first slot of the sub-frame, and it may be the 0th to 6th or the 0th to the 5th OFDM symbols in the 2nd slot of the sub-frame, wherein, the OFDM symbols in each slot are numbered as 0 to 6.

The number of the resources allocated in the relay physical downlink control channel mentioned herein may be more than one in each slot, that is, the resources which maps the relay physical downlink control channel in each slot are divided into N groups, and the REG mapping is performed in each group separately, wherein, N≥1. If not specialized, all said resources of the relay physical downlink control channel refer to such a group.

Figure 20:
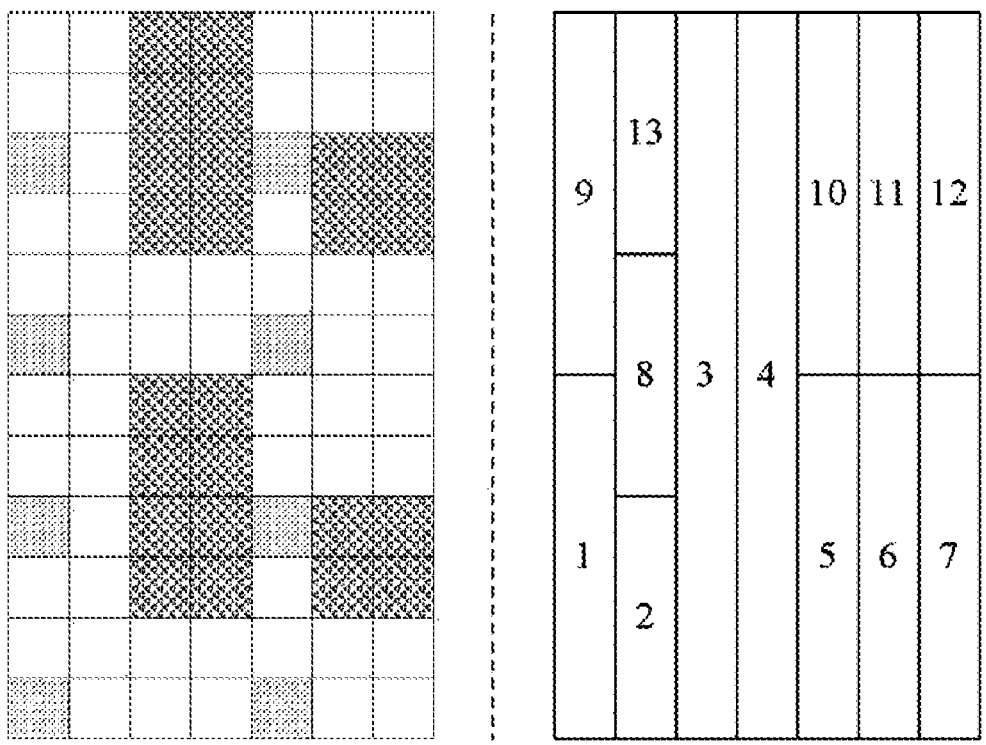
FIG. 20 is a diagram of REG mapping according to the embodiment 5 of the present document.

The left side of the dash line in FIG. 20 shows a diagram of the RS distribution in one RB. ⊠ represents the REs occupied by the CSI-RS transmission and the muting configuration, and ▒ represents the REs occupied by the CRS transmission. In this way, there are 13 REGs included in the RB totally as shown in FIG. 20. It should be noted that the distribution of the RS here is just for illustrating the REG mapping method described by the present document, and it does not indicate that there only exists this distribution way.

The mapping order of first a time direction then a frequency direction is explained specifically by taking FIG. 20 as an example hereinafter. The specific algorithm is shown in Table 1. In Table 1, $0 \leq m' \leq M-1$ represents the REG index, and M represents the number of the REGs mapped in the relay physical downlink control channel resource.

$K_{start} \leq k' \leq K_{end}$ represents the sub-carrier index in the frequency domain, that is, $K_{start}$ is the serial number of the initial sub-carrier of the relay physical downlink control channel resource, and the $K_{end}$ is the serial number of the end sub-carrier of the relay physical downlink control channel resource.

$L_{start} \leq l' \leq L_{end}$ represents the OFDM symbol index in the time domain, in the present example, $L_{start}=0$ represents the serial number of the initial OFDM symbol, and $L_{end}=6$ represents the serial number of the end OFDM symbol.

The P in table 1 represents the serial number of the antenna port transmitting the relay physical downlink control channel, that is, the relay physical downlink control channel can be transmitted with multiple antennas (for example, adopting the transmission mode of the transmission diversity).

In step 4, that the resource element (k', l') represents one REG assigned to the R-PDCCH refers to that the (k', l') is the initial RE of the REG, i.e. the RE with the minimum index in the frequency domain of all REs constituting the REG.

TABLE 1 example for REG resources mapping

① initialize m' = 0 ;
② initialize k' = $K_{start}$ ;
③ initialize l' = $L_{start}$ ;
④ if the resource element (k', l') represents one REG assigned to the R-PDCCH, then step⑤ and ⑥ are executed, or else, step⑦ is executed;
⑤ for each antenna port p , the triad $\overline{w}^{(p)}(m')$ is mapped to the REG represented by the (k', l') ;
⑥ m' = m'+1;
⑦ l' = l'+1;
⑧ if l' ≤ $L_{end}$ , then it is to repeat from step ④;
⑨ k' = k'+1;
⑩ if k' < $K_{end}$ , then it is to repeat from ③.

According to the mapping method of first a time direction then a frequency direction as shown in Table 1, the determined mapping order of the REG as shown in FIG. 20 is shown as the marked number of the REG on the right side of the dash line in FIG. 20.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of the combination of the hardware and software.

The above-mentioned embodiments are only used to illustrate the technical scheme of the present document while not to limit, and the present document is described in details only referring to the preferable embodiments. Those skilled in the art should understand that they can make the modifications and equivalents according to the technical scheme of the present document without departing from the spirit and scope of the present document, all the modifications and equivalents should be within the scope of the appending claims of the present document.

INDUSTRIAL APPLICABILITY

The above-mentioned embodiments have solved the determination and mapping problem of the relay link resource element group. When the downlink control information is transmitted over the relay link, the bearer of the control information can be performed according to the REG directly. The design of the REG described by the present document fully considers the design of the REG when there is the CRS, CSI-RS and the DMRS in the relay link, there is a relatively small change for the existing protocol, and there is a good backward compatibility, thus solving the problem of sending the relay link downlink control information.

What we claim is:

1. A method for determining a relay link resource element group, comprising:
    determining by a base station a size of the relay link resource element group according to a pattern of a non-zero-power Channel State Information Reference Signal (CSI-RS) or a pattern of a zero-power CSI-RS or a pattern of a Common Reference Signal (CRS) occurred in allocated resources, or a pattern of a Demodulation Reference Signal (DMRS) occurred in the allocated resources, wherein the DMRS is transmitted in a resource block in which the resource element group locates;
    using the allocated resources to transmit relay link physical downlink control channel by the base station to a relay node, wherein the allocated resources include one or more continuously or discretely distributed resource blocks in frequency domain, and include one or more Orthogonal Frequency Division Multiplexing (OFDM) symbols in time domain;
    wherein when determining the size of the resource element group according to the pattern of the occurred non-zero-power CSI-RS, or the occurred pattern of the occurred zero-power CSI-RS in the allocated resources, the size of the resource element group is all determined according to a CSI-RS pattern with 8 ports,
    wherein determining the size of the resource element groups according to the CSI-RS pattern with 8 ports refers to that all resource elements corresponding to the 8-port CSI-RS are unavailable for data mapping of the resource element group.

2. The method according to claim 1, wherein,
    when there is only the Common Reference Signal (CRS) transmitted in the OFDM symbol of the allocated resources, the size of the resource element group located in the OFDM symbol is determined as 6 continuous resource elements; and
    when there is not any reference signal transmitted in the OFDM symbol of the allocated resources, the size of the resource element group located in the OFDM symbol is determined as 4 continuous resource elements.

3. The method according to claim 2, further comprising:
    determining a number of the resource element groups in the relay link according to the size of the resource element group and the allocated resources.

4. The method according to claim 1, wherein,
    when the size of the resource element group is determined all according to the 8-port CSI-RS pattern, the resource element group in the allocated resources is located in one OFDM symbol; when non-zero-power CSI-RS or zero-power CSI-RS occurs in the OFDM symbol, and:
    when a number of the 8-port CSI-RS patterns corresponding to the non-zero-power CSI-RS pattern, the zero-power CSI-RS pattern, or both of the non-zero-power CSI-RS pattern and the zero-power CSI-RS pattern in the OFDM symbol is 1 in total, the size of the resource element group in the OFDM symbol is determined as 6 continuous resource elements, wherein, the 6 continuous resource elements include 4 available resource elements;
    when the number of the 8-port CSI-RS patterns corresponding to the non-zero-power CSI-RS pattern, the zero-power CSI-RS pattern, or both of the non-zeropower CSI-RS pattern and the zero-power CSI-RS pattern in the OFDM symbol is 2 in total, the size of the resource element group in the OFDM symbol is determined as 12 continuous resource elements, wherein, the 12 continuous resource elements include 4 available resource elements;

when the number of the 8-port CSI-RS patterns corresponding to the non-zero-power CSI-RS pattern or the zero-power CSI-RS pattern, or both of the non-zero-power CSI-RS pattern and the zero-power CSI-RS pattern in the OFDM symbol is 3 in total, it is determined that no resource element group mapping is in the OFDM symbol; and the available resource elements are used for data mapping of the resource element group.

5. The method according to claim 4, further comprising:
determining a number of the resource element groups in the relay link according to the size of the resource element group and the allocated resources.

6. The method according to claim 1, further comprising:
determining a number of the resource element groups in the relay link according to the size of the resource element group and the allocated resources.

7. The method according to claim 6, further comprising:
mapping the resource element group to the allocated resources in an order of first a time direction then a frequency direction.

8. An apparatus for determining a relay link resource element group, applied in a base station, comprising:
a processor and a memory having computer executable instructions to be executed by the processor, the processor configured to:
obtain a pattern of a non-zero-power Channel State Information Reference Signal (CSI-RS) in an Orthogonal Frequency Division Multiplexing (OFDM) symbol in which the resource element group locates; and
obtain configuration information of a zero-power CSI-RS in the OFDM symbol in which the resource element group locates, and determine a pattern of the zero-power CSI-RS based on the configuration information; or
obtain a pattern of a Common Reference Signal (CRS) transmitted in the OFDM symbol in which the resource element group locates; or
obtain a pattern of a Demodulation Reference Signal (DMRS) transmitted in the resource block in which the resource element group locates; or
determine a size of the relay link resource element group according to a pattern of a non-zero-power Channel State Information Reference Signal (CSI-RS) or a pattern of a zero-power CSI-RS or a pattern of a Common Reference Signal (CRS) occurred in allocated resources, or a pattern of a Demodulation Reference Signal (DMRS) occurred in the allocated resources, wherein the DMRS is transmitted in a resource block in which the resource element group locates, so that the size of the relay link resource element group is used to carry downlink control information;

wherein the processor is further configured to: when determining the size of the resource element group according to the occurred pattern of the non-zero-power CSI-RS, or the occurred pattern of the zero-power CSI-RS in the allocated resources, determine the size of the resource element group according to the CSI-RS pattern with 8 ports;

wherein, a CSI-RS pattern is a pattern of the non-zero-power CSI-RS in the OFDM symbol in which the resource element group locates or a pattern of the zero-power CSI-RS in the OFDM symbol in which the resource element group locates;

wherein, the processor is further configured to: determine that resource elements corresponding to the 8-port CSI-RS are unavailable for data mapping of the resource element group.

9. The apparatus according to claim 8, wherein, the processor is further configured to:
when there is only the Common Reference Signal (CRS) transmitted in the OFDM symbol of the allocated resource, the size of the resource element group located in the OFDM symbol is determined as 6 continuous resource elements; and
when there is not any reference signal transmitted in the OFDM symbol of the allocated resource, the size of the resource element group located in the OFDM symbol is determined as 4 continuous resource elements.

10. The apparatus according to claim 8, wherein, the processor is further configured to:
when a number of the 8-port CSI-RS patterns corresponding to the non-zero-power CSI-RS pattern, the zero-power CSI-RS pattern, or both of the non-zero-power CSI-RS pattern and the zero-power CSI-RS pattern in the OFDM symbol is 1 in total, determine the size of the resource element group in the OFDM symbol as 6 continuous resource elements, wherein, the 6 continuous resource elements include 4 available resource elements;
when the number of the 8-port CSI-RS patterns corresponding to the non-zero-power CSI-RS pattern, the zero-power CSI-RS pattern, or both of the non-zero-power CSI-RS pattern and the zero-power CSI-RS pattern in the OFDM symbol is 2 in total, determine the size of the resource element group in the OFDM symbol as 12 continuous resource elements, wherein, the 12 continuous resource elements include 4 available resource elements;
when the number of the 8-port CSI-RS patterns corresponding to the non-zero-power CSI-RS pattern, the zero-power CSI-RS pattern, or both of the non-zero-power CSI-RS pattern and the zero-power CSI-RS pattern in the OFDM symbol is 3 in total, determine that no resource element group mapping is in the OFDM symbol; and
wherein, the available resource elements are used for data mapping of the resource element group.

* * * * *